United States Patent
Tang

(10) Patent No.: US 8,204,318 B2
(45) Date of Patent: Jun. 19, 2012

(54) METHOD AND APPARATUS FOR IMAGE COMPRESSION AND DECOMPRESSION

(75) Inventor: Pei-Chong Tang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1041 days.

(21) Appl. No.: 12/136,776

(22) Filed: Jun. 11, 2008

(65) Prior Publication Data

US 2009/0154802 A1    Jun. 18, 2009

(30) Foreign Application Priority Data

Dec. 13, 2007   (CN) .......................... 2007 1 0203038

(51) Int. Cl.
*G06K 9/36* (2006.01)
(52) U.S. Cl. .......................... 382/232; 382/166; 382/246
(58) Field of Classification Search .................. 382/166, 382/232
See application file for complete search history.

(56) References Cited

U.S. PATENT DOCUMENTS 6,571,264 B1 * 5/2003 Lee ................................. 708/495
7,339,505 B2   3/2008 Lee et al.

FOREIGN PATENT DOCUMENTS

JP   2005-136781 A     5/2005
JP   2005136781 A  *  5/2005

* cited by examiner

*Primary Examiner* — Jason M Repko
*Assistant Examiner* — David Perlman
(74) *Attorney, Agent, or Firm* — Altis Law Group, Inc.

(57) ABSTRACT

A method of image compressing is provided. During compressing, color intensity of the image is considered. When the color intensity of the image is relatively high, lower bits used for representing the image are dropped. When the color intensity of the image is relatively low, upper bits used for representing the image are dropped. By this, the image is compressed according to color intensity of the image. Therefore, the images with different color intensities are compressed dynamically. Correspondingly, a method of image decompressing is provided. Moreover, a compressing apparatus and a decompressing apparatus are also provided.

9 Claims, 6 Drawing Sheets

METHOD AND APPARATUS FOR IMAGE COMPRESSION AND DECOMPRESSION

BACKGROUND

1. Field of the Invention

The present invention generally relates to image processing, and particularly to a method and an apparatus for image compression and decompression.

2. Description of Related Art

Various kinds of image formats such as bitmap (BMP), joint photographic experts group (JPEG), graphics interchange format (GIF), and so on are used for representing images. Particularly, the bitmap is a widely used image format that is generally represented with a two dimensional array of pixels. The bitmap is characterized by a number of bits per pixel (a color depth, which determines the number of colors it can represent).

Generally, each pixel of the bitmap has three individually defined color data: red, green, and blue. The amount of color information in each pixel determines the quality of the bitmap. Typically, each pixel of an uncompressed bitmap stores forty-eight bits digital data (sixteen bits corresponding to each color data) or twenty-four bits digital data (eight bits corresponding to each color data). A picture quality of the bitmap with forty-eight bits digital data is smoother than that with twenty-four bits digital data.

High-quality bitmap often takes up large amount of disk space, so some image compressing techniques sacrifice image quality to achieve a smaller file size. For example, one image compressing technique always drops lower three data bits of each color data that may be defined by eight bits, thereby a pixel is compressed from twenty-four bits to fifteen bits. However, this image compressing technique does not consider the color intensity factor of the bitmap during compressing. When the color intensity of the bitmap is relative low, the image quality may deteriorate and digital data for representing the color intensity of each pixel are mainly stored in the lower bits. If the lower data bits are dropped for compression, the image is greatly distorted after decompression.

Therefore, what is desired is to provide a method that is capable of compressing and decompressing images such as bitmap images considering color intensity factor and an apparatus for image compression and decompression is also desired.

SUMMARY

Accordingly, a method for compressing image is provided. During compressing, color intensity factor of the image is considered. When the image has a higher intensity, lower data bits of each color data are dropped. When the image has a lower intensity, upper data bits of each color data are dropped. Therefore, the images with different intensities are compressed dynamically. Correspondingly, a method for decompressing image is provided. Moreover, a compressing apparatus and a decompressing apparatus are also provided.

Other advantages and novel features of the present invention will become more apparent from the following detailed description of exemplary embodiment when taken in conjunction with the accompanying drawings.

DETAILED DESCRIPTION

Figure 1:
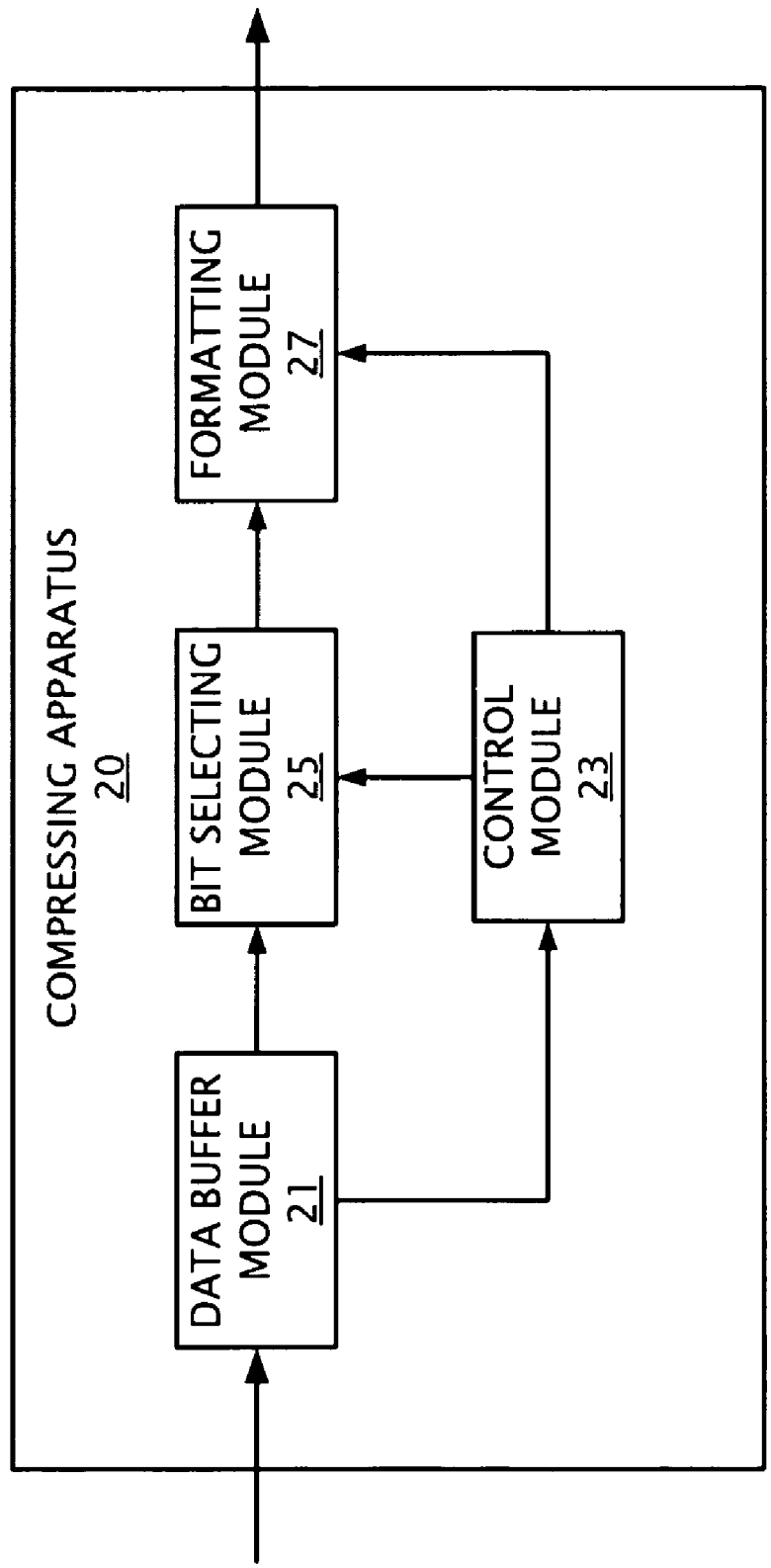
FIG. 1 is a functional block diagram of a compressing apparatus for compressing image according to an exemplary embodiment.

Referring to FIG. 1, a functional block diagram of a compressing apparatus 20 in accordance with an exemplary embodiment is illustrated. The compressing apparatus 20 is used for dynamically compressing digital images such as a bitmap image based on color intensity of the bitmap image. The compressing apparatus 20 includes a data buffer module 21, a control module 23, a bit selecting module 25, and a formatting module 27. It should be noted that the compressing apparatus 20 may further include other functional blocks such as a display module for displaying images and a storage module for storing compressed image files.

The data buffer module 21 is configured to couple to data image generating devices, for example, charge coupled device (CCD) image sensors, for receiving and storing temporarily pixel data.

The control module 23 is connected to the data buffer module 21, the bit selecting module 25, and the formatting module 27. The control module 23 is configured for analyzing color intensity of the pixel data and outputting a data line select signal corresponding to the analyzed color intensity to the bit selecting module 25. The data line select signal reflects the color intensity that should be reserved in compressed image data for decompressing, so that the data line select signal is outputted to the formatting module 27.

The bit selecting module 25 is connected to the data buffer module 21, the control module 23, and the formatting module 27. The bit selecting module 25 is configured for selectively obtaining data bits of the pixel data transmitted from the data buffer module 21 according to the data line select signal transmitted from the control module 23. If the color intensity of a particular pixel is higher than a predetermined value, upper data bits of the particular pixel are selected, whereas lower data bits of the particular pixel are dropped by the bit selecting module 25. If the color intensity of the particular pixel is lower than the predetermined value, lower data bits of the particular pixel are selected, whereas upper data bits of the particular pixel are dropped by the bit selecting module 25. As a result, the pixel data are compressed according to the color intensity.

The formatting module 27 is connected to the control module 23 and the bit selecting module 25. The formatting module 27 is configured for receiving selected data bits transmitted from the bit selecting module 25, and data line select signal from the control module 23. The data line select signal and the selected data bits are combined by the formatting module 27 to yield formatted pixel data.

Figure 2:
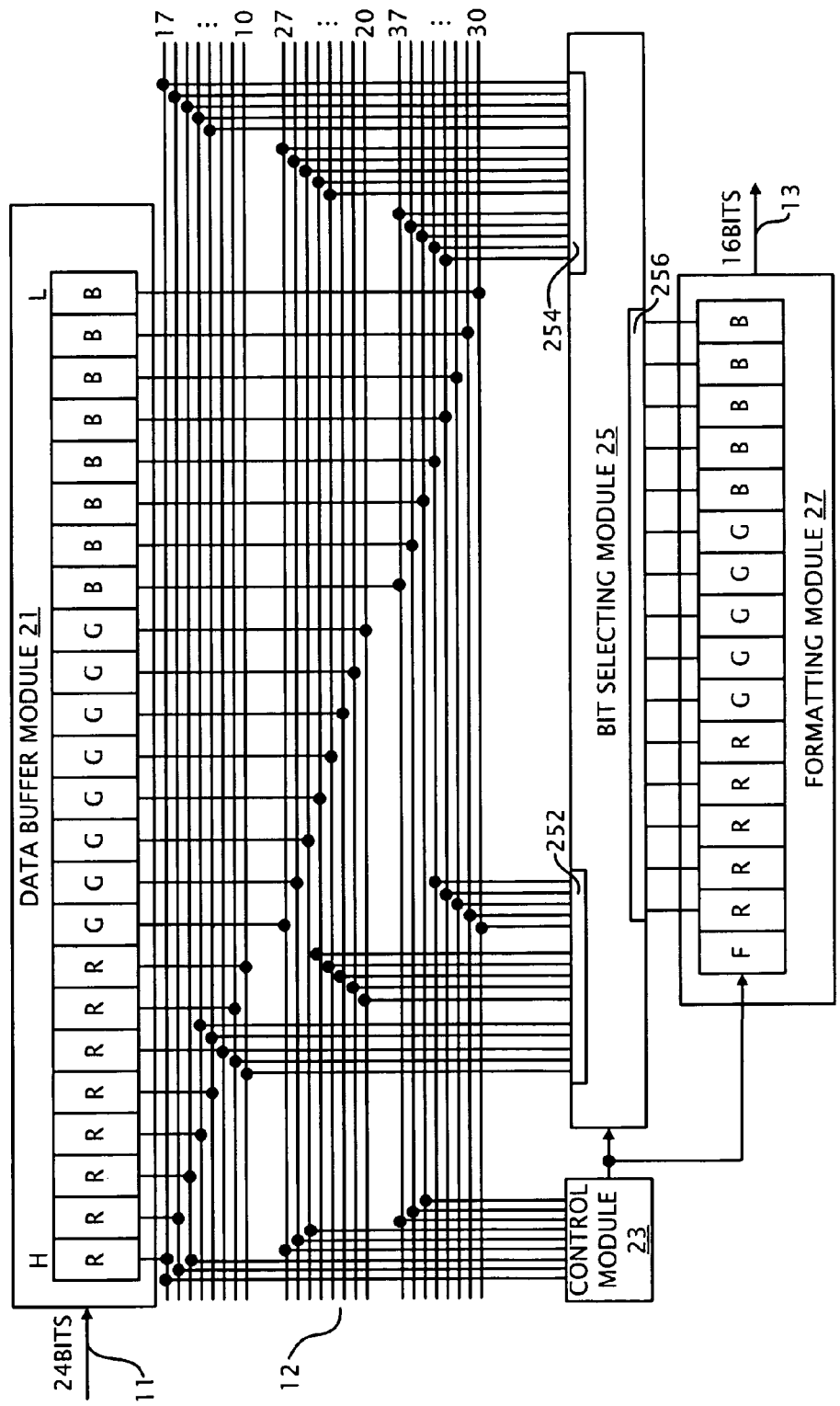
FIG. 2 is a detailed diagram of the image compressing apparatus of FIG. 1.

Referring to FIG. 2, a detailed diagram of the compressing apparatus 20 of FIG. 1 is illustrated. A particular pixel includes three color data: red color data, green color data, and blue color data. Each of the color data are represented with eight bits, thus each of the particular pixel is represented with twenty-four bits totally.

The data buffer module 21 is connected to the control module 23 and the bit selecting module 25 by a data bus 12.

For exemplary purpose, the data bus 12 includes labeled data lines 10~17, 20~27, and 30~37 to more clearly describe the embodiment.

The data buffer module 21 receives pixel data inputted from input line 11. The pixel data include eight bits of the red color data, eight bits of the green color data, and eight bits of the blue color data. The eight bits of the red color data are transmitted to the data lines 10~17. The eight bits of the green color data are transmitted to the data lines 20~27. The eight bits of the blue color data are transmitted to the data lines 30~37.

The control module 23 is connected to the data lines 15~17, the data lines 25~27, and the data lines 35~37. The control module 23 includes an OR gate logic circuit for receiving the upper three bits of the red color data, the green color data, and the blue color data. The control module 23 outputs a logical "0" as the data line select signal if all the bits received are logical "0", otherwise, the control module 23 outputs a logical "1" as the data line select signal. A Logical "1" outputted from the control module 23 as the data line select signal indicates that the color intensity of the particular pixel is relatively high. Conversely, a Logical "0" outputted from the control module 23 indicates that the color intensity of the particular pixel is relatively low.

The bit selecting module 25 includes a first input port 252, a second input port 254, and an output port 256. The first input port 252 is connected to the data lines 10~14, the data lines 20~24, and the data lines 30~34 of the data bus 12. The second input port 254 is connected to the data lines 13~17, the data lines 23~27, and the data lines 33~37 of the data bus 12.

The bit selecting module 25 is configured for selectively receiving data bits from the first input port 252 or the second input port 254 according to the data line select signal. When the data line select signal is logical "0", the first input port 252 is enabled to receive data bits from the data lines 10~14, the data lines 20~24, and the data lines 30~34. When the data line select signal is logical "1", the second input port 254 is enabled to receive data bits from the data lines 13~17, the data lines 23~27, and the data lines 33~37.

The formatting module 27 is connected to the control module 23 and the output port 256 of the bit selecting module 25. The formatting module 27 is configured for receiving data line select signal of logical "0" or "1" outputted from the control module 23 and the selected data bits either from the first input port 252 or from the second input port 254. The formatting module 27 combines the selected data bits with the data line select signal, and yields formatted pixel data. The formatted pixel data is outputted from output line 13. A data size of a particular formatted pixel is sixteen bits, that is, the particular pixel is compressed from twenty-four bits to sixteen bits.

As described above, the pixel data inputted from the line 11 are compressed in view of color intensity of the bitmap image. When the color intensity of the pixel data is relatively high, several lower bits of a particular pixel are dropped from each color data. When the color intensity of the particular pixel is relatively low, several upper bits of the particular pixel are dropped from each color data. Therefore, a dynamic compression to the bitmap image considering the color intensity of the bitmap is achieved.

Figure 3:
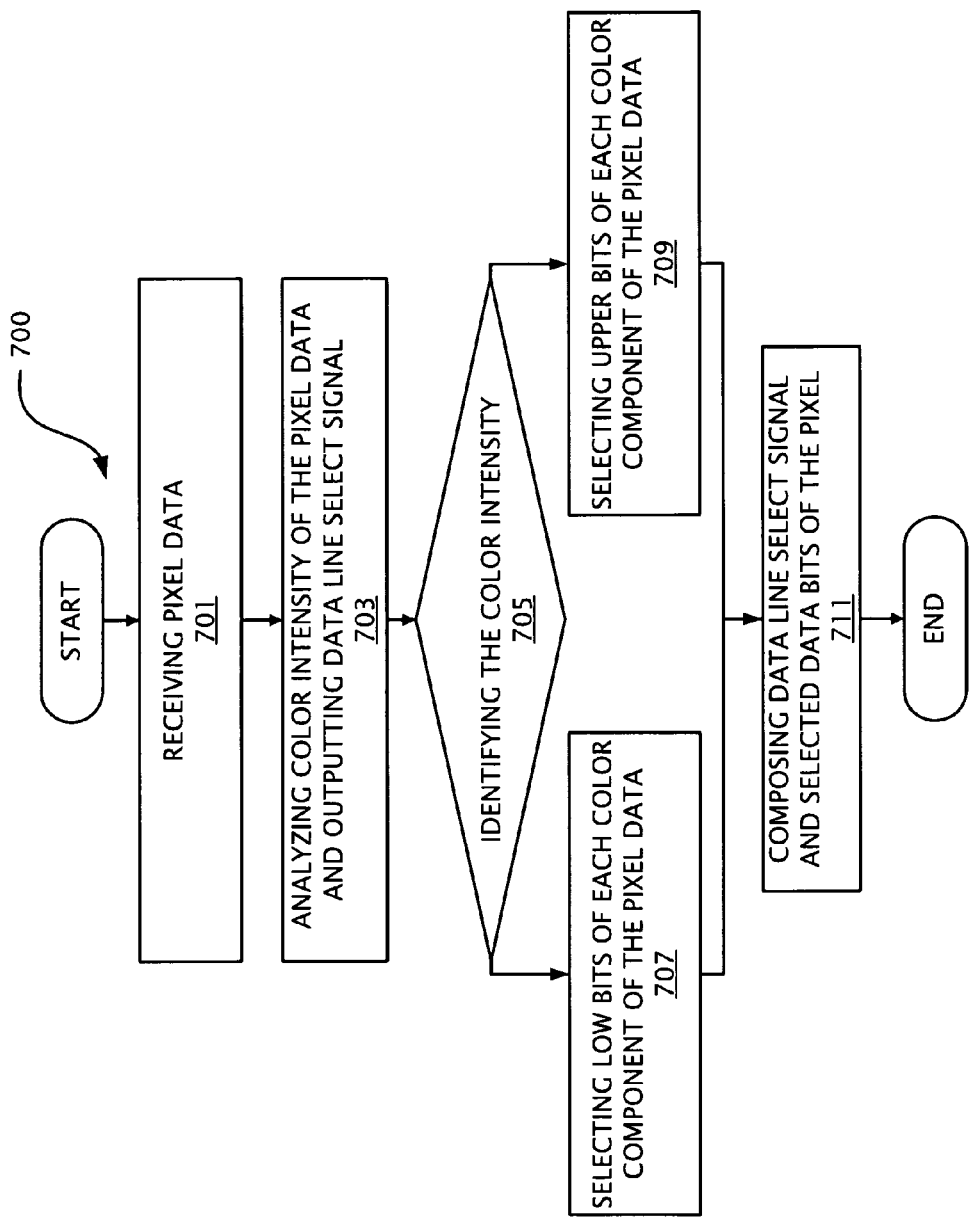
FIG. 3 is a flowchart of image compressing.

Referring to FIG. 3, a method 700 for compressing bitmap image in accordance with an exemplary embodiment is illustrated. In some embodiments, the method 700, or portions thereof, may be performed by the compressing apparatus 20 as described above. The various actions in the method 700 may be performed in the order presented, or may be performed in a different order. Further, in some embodiments, some actions listed in FIG. 3 may be omitted from the method 700.

At block 701, receiving pixel data is performed. The pixel data includes individual color data: red color data, green color data, and blue color data. Each color data is represented with eight bits, and one pixel is represented with twenty-four bits totally. The received pixel data may be temporarily stored in a data buffer module 21 of the compressing apparatus 20.

At block 703, analyzing color intensity of the pixel data and outputting data line select signals corresponding to the color intensity are performed. For example, the control module 23 outputs a logical "0" as the data line select signal if all the bits received are logical "0", otherwise, the control module 23 outputs a logical "1" as the data line select signal. Logical "1" indicates the color intensity is relatively high. Logical "0" indicates the color intensity is relatively low.

At block 705, identifying the data line select signal is performed. For example, the bit selecting module 25 of the compressing apparatus 20 identifies if the data line select signal is logical "0" or logical "1".

At block 707, upon determination that the data line select signal is logical "0", selecting several lower bits of each color data of the particular pixel is performed. For example, if the data line select signal is logical "0", the bit selecting module 25 selects and receives lower five bits (0~4) of each color data from the data buffer module 21.

At block 709, upon determination that the data line select signal is logical "1", selecting upper bits of each color data of the particular pixel is performed. For example, if the data line select signal is logical "1", the bit selecting module 25 selects and receives upper five bits (3~7) of each color data from the data buffer module 21.

At block 711, formatting the data line select signal and the selected data bits is performed. For example, the data line select signal is combined with five bits red color data, five bits green color data, and five bits blue color data, thereby yielding formatted pixel data. Therefore, the formatted pixel data is represented with sixteen bits.

As described above, the method 700 for image compression is performed by compressing the pixel data from twenty-four bits to sixteen bits. As color intensity of the image is considered during compression, so the method for compressing bitmap image is dynamic.

Figure 4:
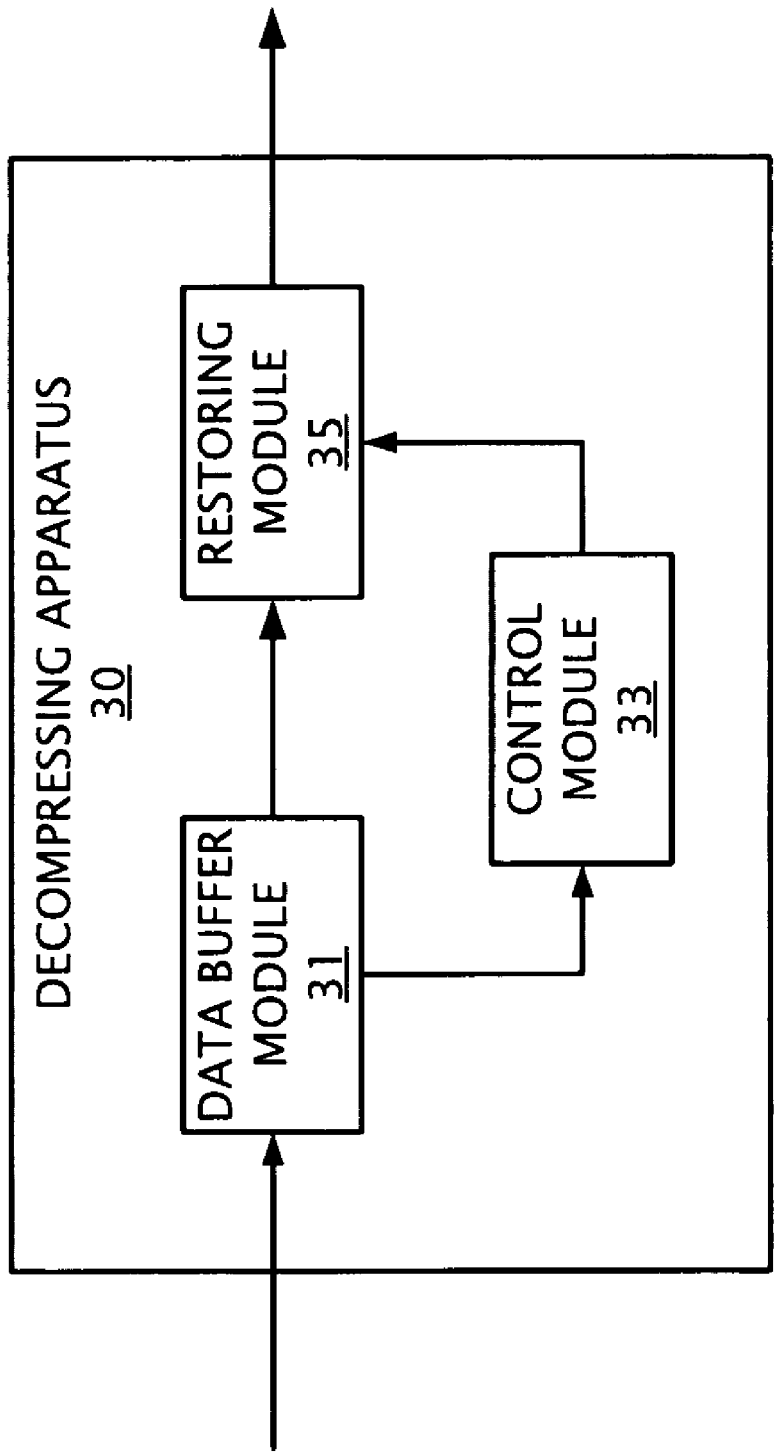
FIG. 4 is a functional block diagram of a decompressing apparatus for decompressing image according to an exemplary embodiment.

Referring to FIG. 4, a decompressing apparatus 30 for decompressing a compressed image in accordance with an exemplary embodiment is illustrated. The decompressing apparatus 30 is used for decompressing the compressed image considering color intensity of the compressed image. The decompressing apparatus 30 includes a data buffer module 31, a control module 33, and a restoring module 35.

The data buffer module 31 is connected to the control module 33 and the restoring module 35. The data buffer module 31 is configured for receiving compressed pixel data. The compressed pixel data may be from a file stored in a storage medium such as an optical disc. The compressed image includes data line select signal and compressed pixel data. The data line select signal is used for indicating color intensity of the compressed pixel data. The compressed pixel data are used for constructing an image with the data line select signal.

The control module 33 is connected to the data buffer module 31 and the restoring module 35. The control module 33 is configured for receiving the data line select signal transmitted from the data buffer module 31, and outputting the data line select signal to the restoring module 35.

The restoring module 35 is connected to the data buffer module 31 and the control module 33. The restoring module 35 is configured for receiving the data line select signal from the control module 33, and decompressing the compressed pixel data based on the data line select signal. If the data line select signal indicates that the color intensity of the compressed pixel data is relatively high, the restoring module 35 inserts several "0" bits to lower bits of each color data of the compressed pixel data. If the data line select signal indicates that the intensity of the compressed pixel data is relatively low, the restoring module 35 inserts several "0" bits to upper bits of each color data of the compressed pixel data.

Figure 5:
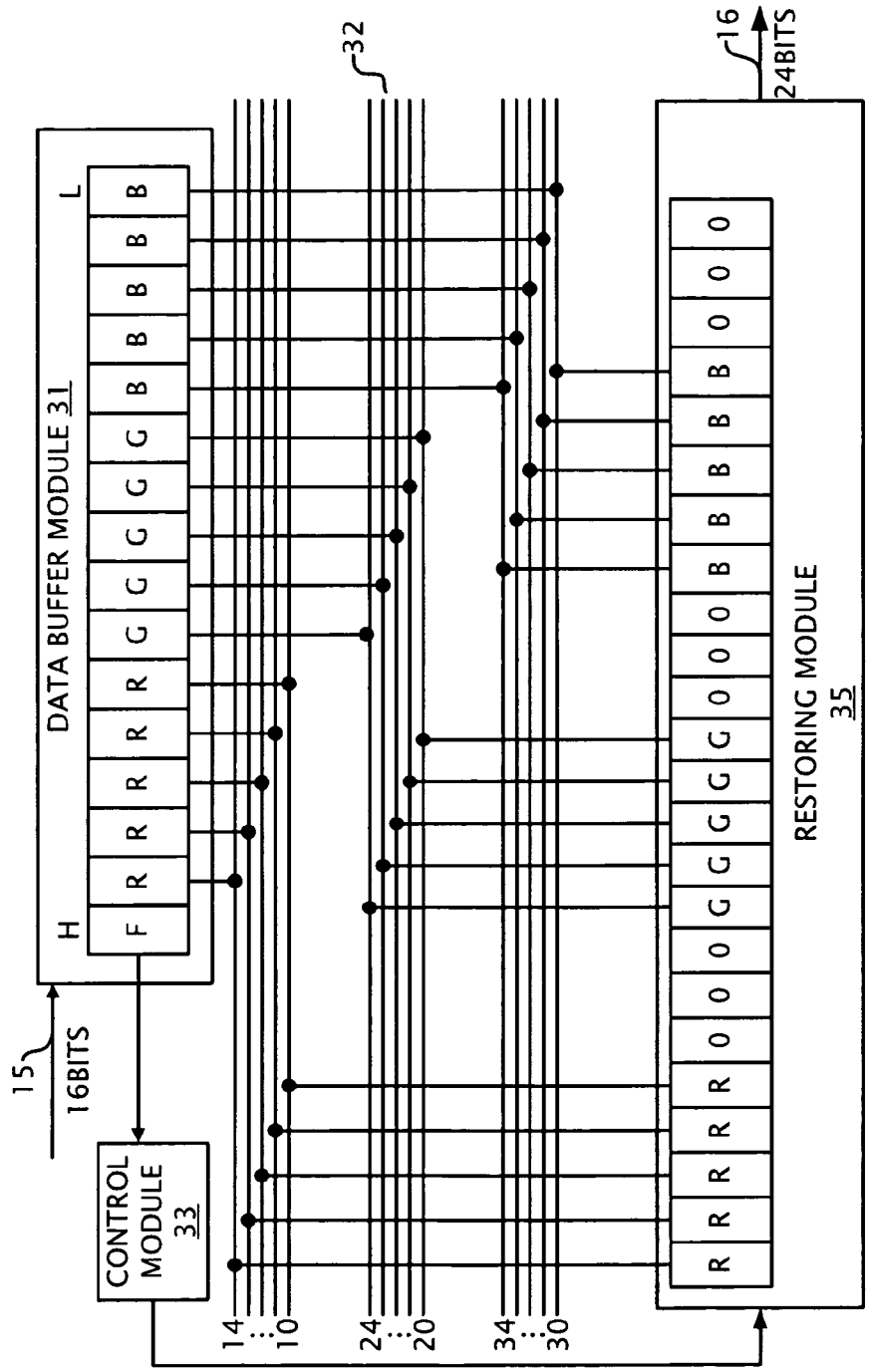
FIG. 5 is a detailed diagram of the image compressing apparatus of FIG. 3.

Referring to FIG. 5, a detailed diagram of the decompressing apparatus 30 in accordance with an exemplary embodiment is illustrated.

The data buffer module 31 receives compressed pixel data from line 15. The compressed pixel data is represented with sixteen bits stored in the data buffer module 31. Each color data of the compressed pixel data are represented with 5 bits. One flag bit "F" is used for indicating the color intensity of the compressed pixel data.

The control module 33 retrieves the flag bit "F" from the data buffer module 31. If the flag bit "F" is logical "1", the color intensity of the compressed pixel data is relatively high. If the flag bit "F" is logical "0", the color intensity of the compressed pixel data is relatively low. The control module 33 outputs data line select signal corresponding to the color intensity to the restoring module 35 for decompressing the compressed pixel data.

The restoring module 35 is connected to the data buffer module 31 by a data bus 32. The data bus 32 includes, and labeled data lines 10~14, 20~24, and 30~34. The restoring module 35 receives compressed red color data, green color data, and blue color data from data lines 10~14, 20~24, and 30~34 respectively.

The restoring module 35 receives data line select signal corresponding to the color intensity of the compressed pixel data. If the data line select signal is logical "1", the restoring module 35 inserts three bits "0" after 5 bits red color data "RRRRRR", 5 bits green color data "GGGGG", and 5 bits blue color data "BBBBB". If the data line select signal is logical "0", the restoring module 35 inserts three bits "0" before the 5 bits red color data "RRRRRR", the 5 bits green color data "GGGGG", and the 5 bits blue color data "BBBBB". The restoring module 35 then outputs decompressed pixel data that is represented with twenty-four bits. Therefore, an image can be constructed by the decompressed pixel data.

Figure 6:
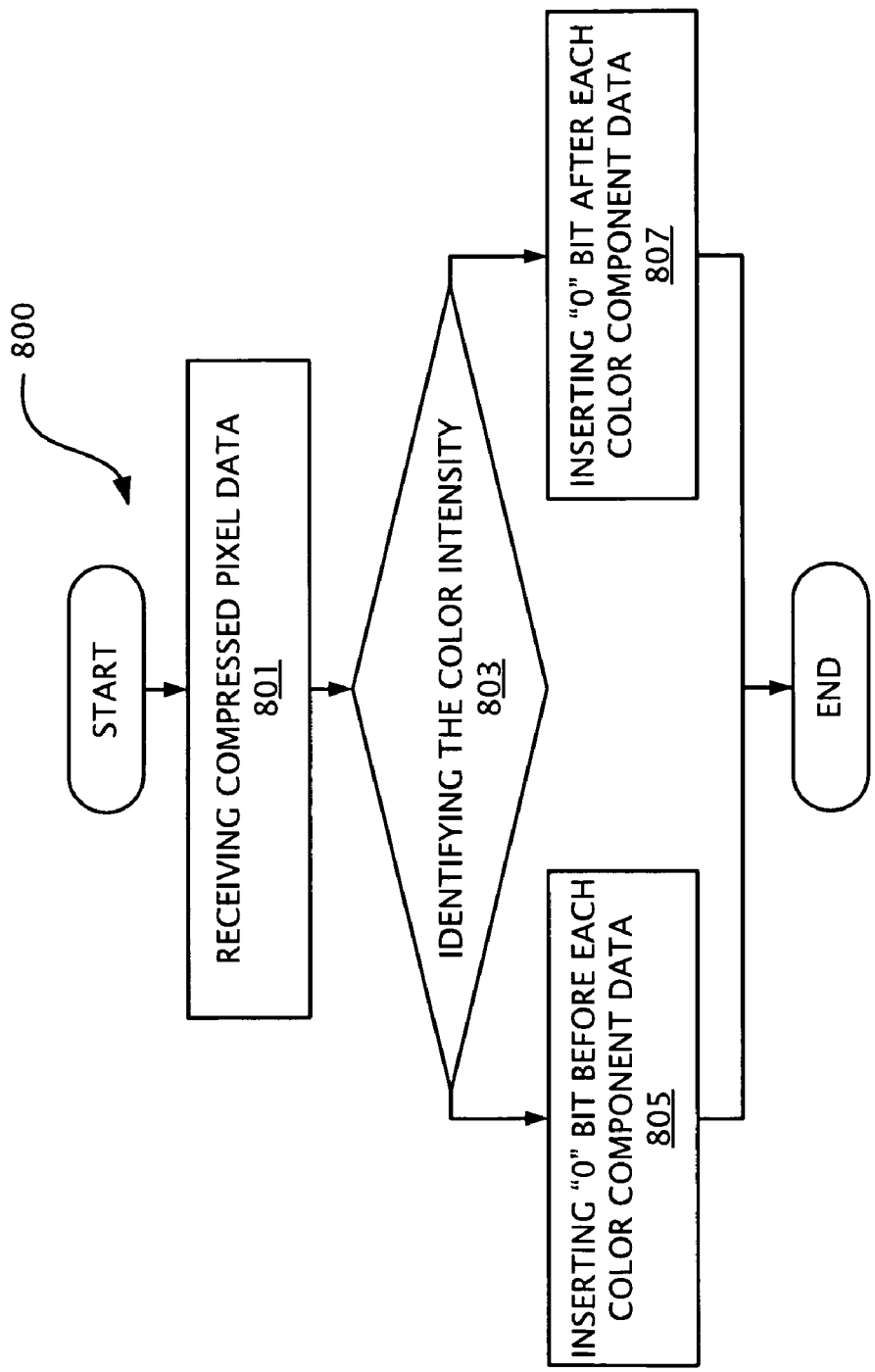
FIG. 6 is a flowchart of image decompressing.

Referring to FIG. 6, a method 800 for image decompression in accordance with an exemplary embodiment is illustrated. In some embodiments, the method 800, or portions thereof, may be performed by the decompressing apparatus 30 illustrated in FIG. 4 and FIG. 5. The various actions in the method 800 may be performed in the order presented, or may be performed in a different order. Further, in some embodiments, some actions listed in FIG. 6 may be omitted from the method 800.

At block 801, receiving compressed pixel data is performed.

At block 803, identifying color intensity from data line select signal contained in the compressed pixel data is performed.

At block 805, upon determination that the color intensity is identified to be relatively high, inserting several "0" bits after each color data is performed.

At block 807, upon determination that the color intensity is identified to be relatively low, inserting several "0" bits before each color data is performed.

As described above, the decompressing apparatus 30 and the decompressing method 800 are used for decompressing from sixteen bits to twenty-four bits in view of color intensity of the compressed pixel data. When the color intensity of the compressed pixel data is relatively high, several "0" bits are inserted after each color data. When the color intensity of the compressed pixel data is relatively low, several "0" bits are inserted before each color data. Therefore, a dynamic image decompression process is achieved.

Alternative embodiments will become apparent to those skilled in the art to which the present invention pertains without departing from its spirit and scope.

What is claimed is:

1. An image compression apparatus for compressing images, the image compression apparatus comprising:
   a data buffer module for receiving pixel data to be compressed, the pixel data comprising a plurality of color data each which comprising Y bits (Y is an integer larger than two);
   a control module connected to the buffer module for determining whether upper N (N is an integer larger than one but smaller than Y) bits of each color data are all zero or not, the control modules generating a first data line select signal when determining the upper N bits of each color data are all zero and generating a second data line select signal when determining the upper N bits of each color data are not all zero;
   a bit selecting module connected to the data buffer module and the control module, the bit selecting module selecting lower Y-N bits in response to the first data line select signal and selecting upper Y-N bits in response to the second data line select signal; and
   a formatting module connected to the bit selecting module and the control module, the formatting module receiving selected data bits of each color data from the bit selecting module, and composing the first data line select signal or the second data line select signal with the selected data bits to yield formatted pixel data.

2. The image compressing apparatus of claim 1, wherein the color data comprises: red color data, green color data, and blue color data, each of the red color data, the green color data, and the blue color data are represented by eight bits.

3. The image compressing apparatus of claim 1, wherein the control module comprises an OR gate, the OR gate receives upper three bits from each color data and outputs the first data line select signal or the second data line select signal to the bit selecting module and the formatting module.

4. The image compressing apparatus of claim 3, wherein when the first data line select signal is a logical "0" for representing relatively low color intensity of the pixel data, the bit selecting module selects the lower five bits of each color data.

5. The image compressing apparatus of claim 3, wherein when the second data line select signal is a logical "1" for representing relatively high intensity of the pixel data, the bit selecting module selects the upper five bits of each color data.

6. A method for compressing images using pixel data of the images, the method comprising:
   receiving the pixel data, the pixel data comprising individual color data, each color data represented with Y (Y is an integer larger than two) data bits;
   identifying color intensity of the pixel data from the color data and outputting data line select signal corresponding to the identified color intensity;

detecting whether upper N (N is an integer larger than one but smaller than Y) bits of each group color data are all zero or not;

generating a first select data line signal if the upper N bits of each group color data are all zero or a second select data line signal if not all the upper N bits of each group color data are zero;

selecting lower Y-N bits from each color data in response to the first select data line signal and selecting upper N bits from each color data in response to the second select data line signal; and composing the selected data bits of each color data with the first data line select signal or the second data line select signal to yield formatted pixel data.

7. The method of claim 6, wherein the color data comprising red color data, green color data, and blue color data, each of the red color data, the green color data, and the blue color data are represented with eight bits.

8. The method of claim 6, wherein the first data line select signal is a logical "0" for representing color intensity of the pixel data is relatively low.

9. The method of claim 6, wherein the second data line select signal is a logical "1" for representing color intensity of the pixel data is relatively high.

* * * * *